Jan. 12, 1971  J. F. LAWRENCE, JR  3,554,036
ROTARY POSITION INDICATOR
Filed April 21, 1969
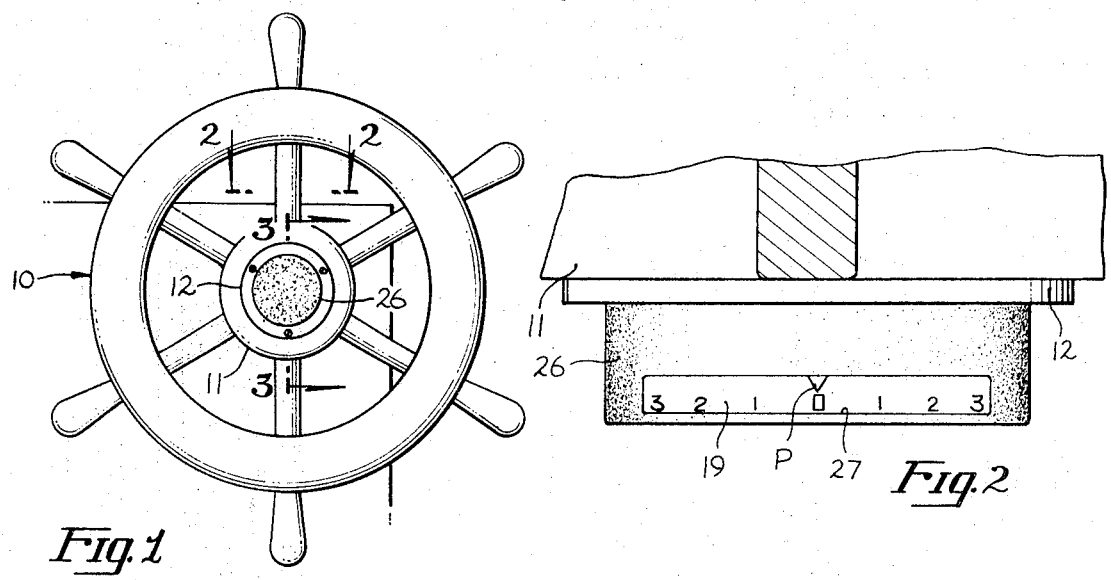
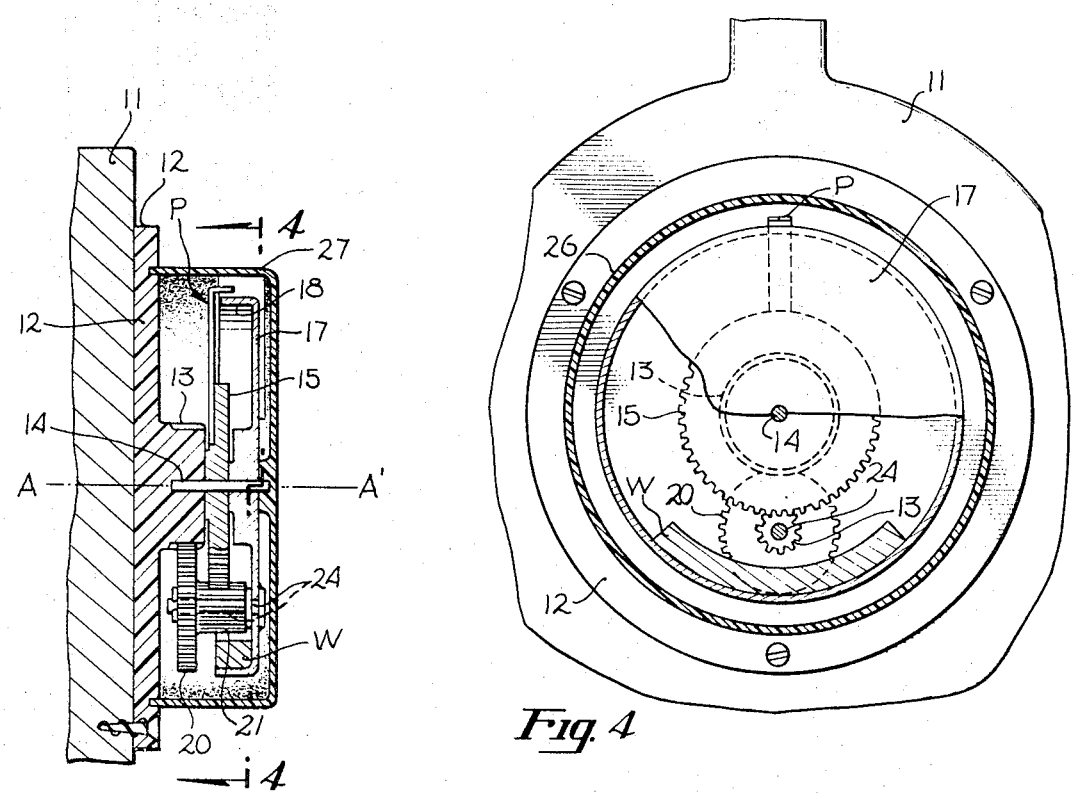
JAMES F. LAWRENCE, JR.
INVENTOR
BY
ATTORNEY United States Patent Office 3,554,036
Patented Jan. 12, 1971

3,554,036
ROTARY POSITION INDICATOR
James F. Lawrence, Jr., 13161 Barrett Hill Circle,
Orange County, Calif. 92705
Filed Apr. 21, 1969, Ser. No. 818,024
Int. Cl. G06m 1/22
U.S. Cl. 74—421　　　　　　　　　　　　　　　3 Claims

ABSTRACT OF THE DISCLOSURE

An indicator for the number of turns through which a multiturn control wheel has been turned from a reference position. The control wheel drives a gear train leading to a pointer, and the pointer moves relatively to a scale on a rotatably mounted member biased to a stationary position by weighting at the bottom.

FIELD OF THE INVENTION

This invention relates generally to mechanical position indicators, and more particularly, to a position indicator for a multiturn rotatable member, such, for example, as a boat steerng wheel, which makes a number of turns in moving a rudder between full port and full starboard. The indicator in this case enables determination of the position of the rudder.

BACKGROUND OF THE INVENTION

There are a number of situations in which a rotating control device makes a number of turns to move a controlled device from one extreme position to another, and in which mere inspection of the rotatable control device furnishes no clue as to the existing position of or setting of the controlled device. In addition to a boat steering wheel and rudder, I may mention a valve wheel and the valve plug turned thereby, also a multiple turn dial counter. In some cases, as with the dial counter, an easy solution is available, if the wheel can be provided with a step-down gear train leading to a pointer movable with relation to a stationarily mounted reference point element. In some cases, however, space limitations prevent this solution; and the present invention is directed to such cases.

BRIEF SUMMARY OF THE INVENTION

According to the invention, a gear is mounted concentrically with the control wheel. This gear meshes with one of a pair of coaxial gears, which are journalled on a bearing supported, off-center, by a dial drum, which is supported for rotation relative to the axis of the first mentioned gear. This dial drum is held stationary merely by weighting at the bottom, and thus provides a stationary reference. The second of the two coaxial gears meshes with and drives a pointer gear, which is rotatably mounted coaxially with the first mentioned gear and the dial drum. The gear ratio is stepped down, so that the pointer gear meshes less than a full turn while the wheel is making its full number of turns. Rotation of the wheel then drives this train of gears, and so moves the pointer along the dial drum through, for example, 180°. The dial drum can be calibrated in terms of position of the controlled device, so that, for any positioning of the wheel, the positions of the controlled device can be read from the position of the pointer along the calibrated scale on the dial drum. A suitable range of pointer travel relative to the dial drum thus can be obtained merely by choice of suitable gear ratio, in the gear train from wheel to pointer.

DESCRIPTION OF THE DRAWINGS

In the drawings:
FIG. 1 is a side elevational view of a boat steering wheel with the indicator of the invention applied thereto;
FIG. 2 is a view taken as indicated on the plane 2—2 of FIG. 1;
FIG. 3 is a vertical section taken on line 3—3 of FIG. 1; and
FIG. 4 is a view taken on line 4—4 of FIG. 3, parts being broken away.

DESCRIPTION OF THE PREFERRED EMBODIMENT

In the drawings, numeral 10 designates the steering wheel of a boat, and this wheel will be understood to be operatively coupled to the rudder, at a ratio, for example, requiring six turns of the wheel to move the rudder between full port and full starboard. The driving gear for this purpose, i.e., from steering wheel to rudder, can be conventional, and is, therefore, not illustrated.

To the hub 11 of this wheel is secured a plastic back plate 12 of the indicator instrument. Coaxially with the wheel axis A–A', the back plate 12 is provided with an integral plastic spur gear 13. Also, projecting coaxially from the gear 13 is a bearing pin 14, on which is rotatably mounted a plastic pointer gear 15. Also rotatably mounted on the bearing pin 14 is the hub of a dial drum 17, provided with a peripheral cylindric flange 18, which may bear a calibrated scale 19 (see FIG. 2). This drum 17 carries a weight W at its bottom, so that it is weight-biased to stand always in its correctly oriented position, and its scale 19 remans in fixed position. The pointer gear 15 bears a pointer P which is bent so that its indicator point travels arcuately, with gear 15, over the stationary dial drum scale 19.

A plastic gear 20, of the same size and number of teeth as gear 13, i.e., of one to one ratio therewith, is integral with a smaller coaxial plastic gear 21, and the two are rotatably mounted on a stationary bearing pin 24 mounted in stationary, bottom-weighted dial drum 17. The gear 21 meshes with the pointer gear 15, and the sizes of these gears are, in the present case, such that gear 21 drives gear 15 at a ratio of 12 to 1. If, then, the wheel turns through six turns (hard port to hard starboard), the gears 20 and 13 will make six turns each, and the gear 15, and pointer P, will turn through a half turn. In practice, the scale 19 can advantageously have a zero center position, and numerals 1, 2, and 3 on opposite sides of zero for 1, 2, and 3 turns towards port or starboard positions.

The instrument is preferably provided with a clear plastic cover 26, or, as shown, the plastic cover can be opaque, with a clear window 27 over the dial scale. The steering wheel can, of course, be substituted for by a rotating steering lever, or tiller, which is the full equivalent, and the generic expression "rotatable control means" will be used in the claims to cover any such means. Also, it will be clear that the rotatable indicator or pointer may equally as well be a rotatable dial, with the scale thereon; and the dial indicia then becomes a reference mark, point or arrow. This is a clear equivalent.

I claim:
1. In a turn indicator for a multiturn control means rotatable about a horizontal axis, the combination of:
　a rotatable base adapted for connection to said rotatable means to turn therewith,
　an eccentrically weighted carrier member rotatably mounted relative to said base about said horizontal axis, said carrier being weight-biased to assume a predetermined stationary position relative to vertical during rotation of said base,
　a train of gears including a driving gear nonrotatably connected to said rotatable base in a position coaxial with said horizontal axis, at least one of the gears of said train being driven from said driving gear and supported from rotation about a horizontal axis on said eccentrically weighted carrier, said train of gears including a driven rotating element which turns about a horizontal axis with stepped down gear ratio from said driving gear, and an arcuately disposed scale and pointer movable in an arcuate path therealong, one on said driven rotating element and one on said carrier.

2. In a turn indicator for a multiturn rotatable control means rotatable about a horizontal axis, the combination of:

a rotatable base adapted for connection to said rotatable means to turn therewith, a carrier member mounted with a horizontal pivot connection to said rotatable base concentrically with said horizontal axis, said carrier member being eccentrically weighted to assume a predetermined stationary position relative to vertical during turning of said base, a gear train of stepped down drive ratio including a drive spur gear concentrically mounted on said base to rotate therewith, and idler spur gear meshing with said drive gear, a second idler gear fixed to and to one side of said last mentioned gear on a common axis, means supporting said idler gears for rotation on said carrier member, and a final spur gear supported from said base for rotation about said horizontal axis, said last mentioned spur gear being driven by said second idler gear, and a dial with a scale thereon and a pointer cooperative therewith, one on said carrier and one on said final spur gear.

3. The subject matter of claim 2, wherein said dial comprises a dial drum on said carrier, and said pointer is mounted on said final gear of said gear train.

References Cited

UNITED STATES PATENTS

| 2,151,534 | 3/1939 | Scofield | 235—103 |
| 3,196,545 | 7/1965 | Zell et al. | 235—95X |

LEONARD H. GERIN, Primary Examiner

U.S. Cl. X.R.

235—103